Figure 1:
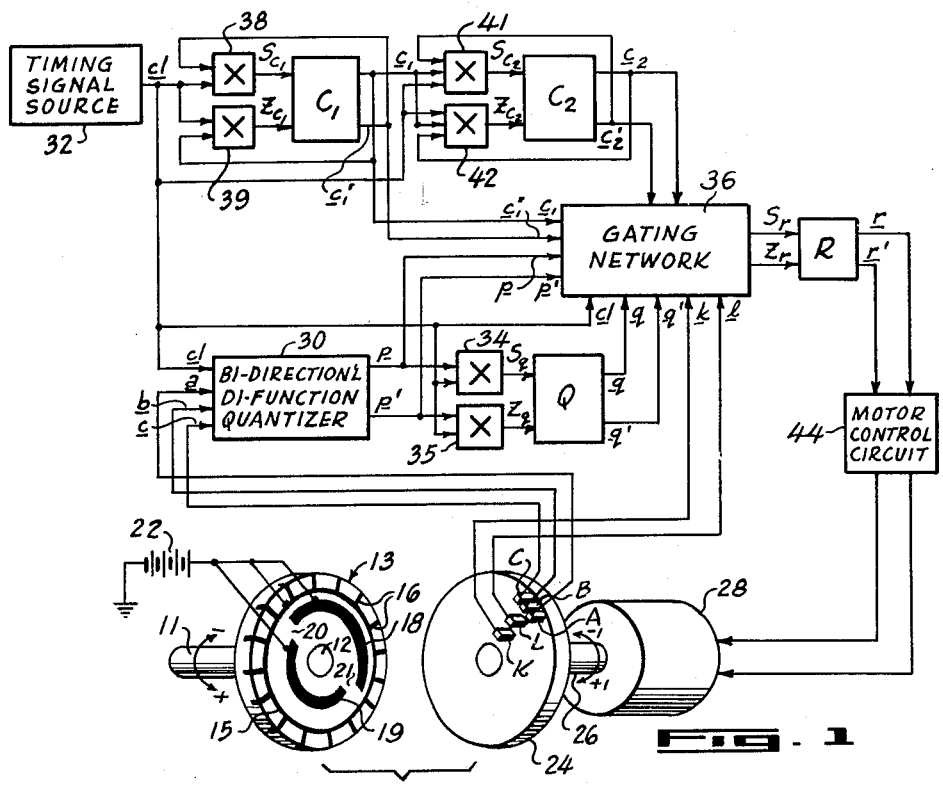

Jan. 3, 1956  F. G. STEELE  2,729,774
DI-FUNCTION NON-LINEAR SERVO SYSTEM
Filed Feb. 13, 1953

INVENTOR:
Floyd G. Steele
BY
ATTORNEY

United States Patent Office 2,729,774
Patented Jan. 3, 1956

2,729,774

DI-FUNCTION NON-LINEAR SERVO SYSTEM

Floyd G. Steele, La Jolla, Calif., assignor to Digital Control Systems, Inc., a corporation of California Application February 13, 1953, Serial No. 336,817

12 Claims. (Cl. 318—31)

The present invention relates to a di-function non-linear servo system, and, more particularly, to a closed-loop servo system employing information in di-function signal form for control purposes.

As generally conceived, servo systems include an input or movable member and an output or driven member, the system sensing the movement of the input member and, in turn, operating to drive the driven member so as to maintain, within specified limits, a correspondence between the instantaneous positions of the two members. The input member may be, for example, a rotatable shaft, with the output or driven member being another shaft and so driven that its angular displacement corresponds to the angular displacement of the input shaft. In general, this is accomplished by producing error information representing the magnitude and direction of the angular difference between the two shafts and processing the information in a computer component in such a way as to provide additional movement for the driven shaft in order to decrease the relative displacement between the two shafts. The relative position where there is no displacement between the two shafts is termed null and is indicated by the error information being of zero value.

The most generally employed manner of representing the error information is in the form of an analogue signal, the computer component of the system employed to operate on such a signal being termed an analogue computing device. As is well recognized, these analogue computing devices function by performing the required operations on the analogue error signal in direct current form without changing the basic form thereof, each of such operations adding finite errors to the computational results owing to voltage and resistor value drifts, etc. This, in turn, imposes a limited accuracy of servo response with the various attempts to improve the accuracy thereof only adding greatly to the circuit complexity with a resulting decrease in its reliability, from an electronic standpoint.

Recently, several digital servo systems have been proposed in which the error information is represented by binary numbers in signal form with the ensuing manipulations thereon, as required for providing data for driving the driven shaft, necessitating extremely elaborate circuitry, that is, numerous gating circuits, flip-flops, storage registers, delay lines, and, in some instances, magnetic storage drums. Thus, although such digital servo systems admittedly provide greater control accuracy than comparable analogue systems, they are so only at the expense of much more elaborate and complex circuitry, with the ensuing greater size, initial high cost, difficulty of servicing, etc.

Recently, an entirely new and novel manner of representing information was conceived, the information being in di-function signal form as discussed at length in the co-pending U. S. application for patent, entitled "Computer and Indicator System," Serial No. 311,609, filed September 26, 1952, to Floyd G. Steele. Briefly, in its most common form a di-function signal comprises a series of alternate low and high voltage levels, each of the levels appearing for an integral number of timing intervals as indicated by a separate timing signal. In this form, a di-function high voltage level for one timing interval is termed a +1 instantaneous value with the corresponding low voltage level for an interval representing a —1 instantaneous value. Also, according to one form of analysis the value of a di-function signal has been defined, considered over a given period of time, as the number of +1 instantaneous values during the period minus the number of —1 values appearing during the same period as divided by the number of the timing intervals occurring during the period of time. Thus, a di-function signal having a surplus of +1 over —1 values during a number of timing intervals has a positive value while a di-function signal having a surplus of —1 over +1 values is of negative value. The information contained in a di-function signal is thus represented by the relative frequency of occurrence of the +1 to —1 values.

The servo system according to the present invention utilizes a di-function signal for controlling the energization of a motor, the motor, in turn, driving the output or driven shaft. In particular, a positively valued di-function signal produces shaft rotation in one direction with a negatively valued di-function signal causing a shaft rotation in the opposite direction. Also, a zero valued di-function signal, that is one comprising equal numbers of +1 and —1 values, when applied to the motor produces no effective rotation thereof.

Essentially, three signals are formed for indicating the rotational differences between the input and output shafts. The presence of a first signal, an error signal, indicates that the driven shaft is displaced in one direction from the null position. The presence of a second signal, also an error signal, signifies that the driven shaft is displaced in the other direction from null, while the remaining or third signal is a di-function signal whose value indicates the direction of relative movement between the two shafts.

These three signals, in turn, are combined by an appropriate gating network for triggering an electronic switching device into producing an output di-function signal which is applied as a driving signal to the motor. This output signal comprises a series of all +1 values, affording maximum driving power to the motor, whenever an error is indicated by the presence of the first error signal and the value of the third or di-function signal indicates that the error is either remaining static or increasing by being either of zero or of positive value, respectively. Also, under the same circumstances, when the di-function value of the third signal is negative indicating, in turn, that null is being approached, the gating network triggers the switching device such that its di-function signal comprises groups of three consecutive +1 values followed by a single —1 value such that only one-half full power is applied to the motor for continuing its being driven toward null. This latter type of operation is desirable in order to reduce the tendency of the driven shaft to be propelled at full power past null with the resultant overshoot and hunting.

In the same manner, whenever a negative displacement is indicated by the presence of the second error signal, and the corresponding di-function output signal is of either zero or negative value, indicating the error displacement is either remaining static or increasing away from null, respectively, the switching device is triggered by the gating network such that its difunction output signal contains all —1 values which, in turn, causes the motor to be fully energized for driving its respective shaft toward null. Also, when a negative displacement is indicated by the presence of the second error signal, and the third signal di-function valve is positively valued, indicating that null is being approached, then the signal applied to the motor contains groups of three consecutive —1 values followed by a single +1 value to thereby energize the motor with one-half negative power toward null. This latter type of operation will, as formerly, tend to minimize hunting.

It is, therefore, the principal object of the present invention to provide a closed loop servo system utilizing information in di-function signal form.

Another object of the present invention is to provide a device for sensing the error between an input and driven shaft, and applying a di-function signal to a motor driving the driven shaft so as to maintain the relative displacement between the two shafts substantially constant.

A further object of the present invention is to provide a device utilizing information in di-function signal form for sensing both the direction and the change in direction of the error between a driven shaft and an input shaft and driving the driven shaft so as to always maintain a predetermined angular position between it and the input shaft.

A still further object of the present invention is to provide a device for producing first and second signals indicating first and second directions of displacement between an input and an output shaft, respectively, and a third di-function signal whose value indicates the direction of change of the relative displacement, and computing with the first, second and third signals to produce a di-function driving signal for the motor coupled to the output shaft for rotating it in accordance with the rotation of the input shaft.

Still another object of the present invention is to provide a device for sensing the direction of error between input and output rotating shafts as either of one of two signals and the change of this error as the value of a di-function signal, and selectively applying either full power, one-half forward power, one-half reverse power, or full reverse power to a motor driving the output shaft in accordance with the particular direction error signal present and the value of the di-function signal whereby the output shaft follows the input shaft.

Figure 2:
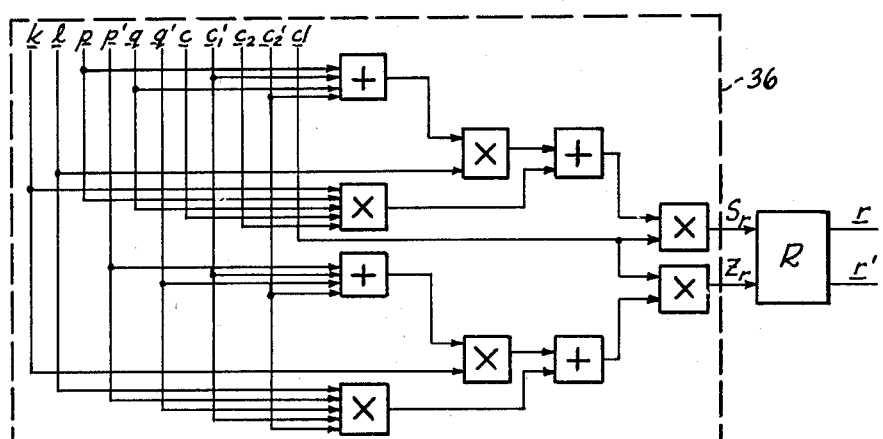
Figure 3:
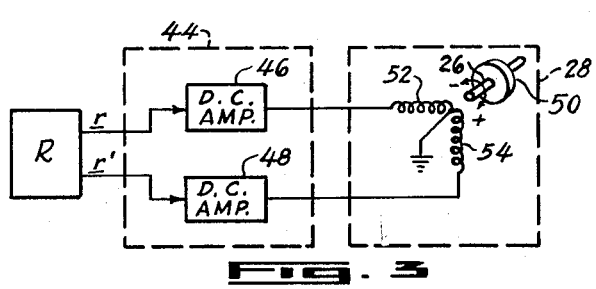

Other objects and features of the present invention will be readily apparent to those skilled in the art from the following specification and appended drawings wherein is illustrated a preferred form of the invention, and in which:

Figure 1 is a partly block schematic and partly perspective showing of the servo system according to the present invention; and Figures 2 and 3 are circuit diagrams, in block schematic form, of a pair of the circuit components of the system according to Figure 1.

Referring now to the drawings, wherein like circuit elements are given the same numerical designation, there is illustrated in Figure 1, a di-function non-linear servo system according to the present invention. In particular, a rotatable driving or command shaft 11 has affixed at one end 12, a command disk 13 formed of non-conductive material. Disk 13 has, on its outer face, an annular conductive segment 15 extending adjacent to but spaced from the periphery thereof, segment 15 including a plurality of equally spaced fingers or arms 16 extending radially to the periphery. Also included on this outer face is a first semi-circular track or segment 18 having an outer radial dimension less than the inner radial dimension of segment 15 and extending around end 12 for slightly less than 180°. A second semi-circular segment 20 also extends for slightly less than 180° around end 12, its outer radial dimension being less than the inner radial dimension of segment 18. The ends of segments 18 and 20 are symmetrically spaced with respect to each other so as to form a fiducial gap 20, on the left as viewed from Figure 1, and an overriding gap 21 on the right. Gaps 20 and 21 may subtend the same angle considered from the center point of end 12 with their arcuate lengths being determined by considerations to be later set forth. Segments 15, 18 and 20 may be formed on disk 13 in accordance with established etched or printed circuit techniques and, accordingly, lie flush with the remaining surface thereof.

Segments 15, 18 and 19 are each connected to the positive terminal of a source of potential, such as battery 22, the negative terminal thereof being connected to ground. Although such connections are here schematically shown, for convenience, as extending directly from their respective conductive members to battery 22, as will be apparent, from practical considerations, such conductive contacts preferably should be made through appropriate slip rings arranged on shaft 11.

Shaft 11 and disc 13 are adapted for mating relationship with a driven disc 24 mounted on one end of the shaft 26 of a motor 28, the disc and shaft pairs here being illustrated in an expanded form for the sake of clarity. Disc 24, preferably constructed of non-conductive material, and preferably of the same radius as disc 13, has affixed adjacent its periphery three brushes, designated A, B and C, which upon proper alignment and positioning of shafts 11 and 26 are adapted for wiping contact with the various conductive arms 16 extending from annular member 15 as well as the non-conductive portions of disc 13 lying between each adjacent pair of arms. The radial dimensions of brushes A, B and C should be of such magnitude that annular segment 15 is never contacted upon subsequent relative rotational movements between the two discs.

Another brush L is mounted on the face of disc 24 at a radial distance from the center of shaft 26 equivalent to the average radial distance of segment 18 from end 12, and thus makes conductive contact with segment 18 during certain prescribed angular displacements between discs 13 and 24 and makes contact only with the non-conductive portions of disc 13 during the remaining angular displacements. A final brush K is mounted in radial alignment with brush L at a distance from the center of shaft 26 so as to lie at a distance corresponding to the radial distance of segment 19 from end 12. Thus, brush K is adapted for wiping engagement with segment 19 during certain angular displacements between discs 13 and 24 and makes contact with the non-conductive portions of disc 13 during the remaining angular displacements. In this case also, for the sake of clarity, the brush output conductors are illustrated as being directly connected thereto whereas, in practice, the usual slip-ring arrangement would be most preferable, as will be appreciated by those skilled in the art.

Brushes A, B and C are conductively coupled to the signal $a$, $b$ and $c$ input conductors of a bi-directional di-function quantizer 30, quantizer 30 being similar in all respects to the quantizer designated 34 in the before referred to application for patent, Serial No. 311,609. The other input signal applied to quantizer 30 is the output signal, designated $cl$, of a timing signal source 32, signal $cl$ comprising, for example, a series of alternate high and low voltage levels, each adjacent low and high level thereof marking or measuring a single timing interval. Timing source 32 may consist of a free running multivibrator circuit, for example.

The pair of complementary output signals $p$ and $p'$ of quantizer 30 are applied to one input terminal of each of two terminal "and" gating circuits 34 and 35, respectively. Timing signal $cl$ of source 32 is applied to the other input terminal of each of gating circuits 34 and 35, with their output terminals being coupled to the $S_q$ and the $Z_q$ input conductors, respectively, of an electronic switching device, such as flip-flop Q. The terminology and symbols herein employed for the gating circuits and flip-flops are similar to those previously described and used in connection with the above referred to application for patent.

Signal $cl$ is also applied to one input terminal of each of two two-terminal "and" gating circuits 38 and 39, the output terminals of which are coupled to the $S_{c_1}$ and $Z_{c_1}$ input conductors, respectively, of another electronic switching device, such as flip-flop $C_1$. The complementary $c_1$ and $c_1'$ output signals of flip-flop $C_1$ are applied to the other input terminals of gating circuits 39 and 38, respectively, signal $cl$ being additionally applied to one input terminal of each of two three terminal "and" gating circuits 41 and 42, respectively. Signal $c_1$ is applied to another input terminal of each of gating circuits 41 and 42 with the output terminals of circuits 41 and 42 being connected to the $S_{c_2}$ and $Z_{c_2}$ input conductors, respectively, of another electronic switching device, such as flip-flop $C_2$. The pair of complementary output signals $c_2$ and $c_2'$ of flip-flop $C_2$ are, in turn, coupled to the remaining input terminals of gating circuits 42 and 41, respectively.

A gating network 36, here indicated in block diagrammatic form and illustrated in further detail in Figure 2, has applied to it signals $cl$, $c_1$, $c_1'$, $c_2$, and $c_2'$, all forming, as will be later described, input timing signals. Also applied to network 36 are the $p$ and $p'$ output signals of quantizer 30, the $q$ and $q'$ output signals of flip-flop Q, with the L and K brushes on disc 24 being also connected thereto. The pair of output conductors of network 36 are coupled to the $S_r$ and the $Z_r$ input conductors of another electronic switching device, such as flip-flop R, producing complementary output signals $r$ and $r'$ on its two output conductors. Signals $r$ and $r'$ are applied to a motor control circuit 44, circuit 44, in turn, acting to control the application of power to the windings of motor 28 in a manner more fully illustrated in Figure 3.

Before considering in detail the operation of the present system, it is first of all necessary to establish certain mechanical and spacing relationships between the brushes on disc 24 and the conductive segments on disc 13. First of all, the same relationships should exist between brushes A, B and C and arms 16 as discussed previously in connection with the device producing the input signals for the quantizer of the before referred to application for patent. In particular, the spacing between any two adjacent arms 16 must be greater than the arcuate distance between the outer edges of brushes A and C in order that only one arm be in a position to be contacted by the brushes at any given time. Also, the arcuate width of any of the arms 16 should be less than the spacing between any two adjacent brushes in order that only one brush be contacted by one arm at any given instant.

In considering brushes L and K, it is necessary that their arcuate widths be less than the arcuate dimensions of gaps 20 and 21. This is required so that at null condition, that is, at exact correspondence between the angular displacements of shafts 11 and 26, as attained when brushes K and L lie within fiducial gap 20, neither brush will be contacted by its respective conductive segment. This simultaneous lack of signals on brushes L and K gives an electrical indication that the null condition exists and, as will be later demonstrated, during null periods, disc 24 will be so driven as to cause brushes L and K to hunt back and forth within gap 20 between the edges of segments 18 and 19. The significance of overriding gap 21 will be later set forth, it being primarily a means for providing continued, although inaccurate, operation of the servo system in the event motor shaft 26 should, owing to excessive demands on the system, lag shaft 11 by half of a revolution or multiples thereof. For the purpose of making clear the subsequent description of operation of the system, discs 13 and 24 will be considered from the standpoint of their illustrated expanded relationship, it being understood, however, that in practice their positioning as above described must be observed.

Shaft 11, as contemplated, may have a wide range of angular velocity in either direction, the purpose of the system being to provide energy to motor 28 such that disc 24 will, within specified limits, be provided angular displacements corresponding to those of disc 13. Broadly, this was done by applying to motor control circuit 44, the di-function output signal $r$ produced by flip-flop R, each instantaneous di-function value of $+1$ being applied by circuit 44 to motor 28 so as to energize it into applying a clockwise torque, as viewed from Figure 1, on shaft 26, with each instantaneous di-function value of $-1$ serving to energize motor 28 so as to apply a counter-clockwise torque on shaft 26. Accordingly, it is the triggering of flip-flop R by gating network 36 that essentially determines the follow-up characteristics of driven disc 24.

Considering briefly now, the circuit's operation during off-null relative disc positions, if shaft 11 rotates further than shaft 26 in the, as is here designated positive or counter-clockwise direction as viewed from Figure 1, brush L will make contact with segment 18 and the potential of battery 22 appearing on brush L, in turn, acts as an error signal to indicate that this positively designated displacement, as indicated by the arrow on shaft 11, has occurred. Upon such an occurrence, flip-flop R will be triggered to produce one of two differently valued di-function output signals, the particular valued signal, in turn, depending upon the value of the di-function output signal $p$ from di-function quantizer 30.

For example, quantizer 30 may produce either a zero-valued signal $p$ indicating at that time no change of relative angular displacement between shafts 11 and 26 is occurring or may produce a positively valued signal $p$ indicating that the magnitude of the error is increasing. For both of these valued output quantizer signals, flip-flop R is triggered to produce a continuous stream of $+1$ instantaneous di-function values which, by action of the motor control circuit, are employed to apply the maximum possible power to motor 28 in its positive direction, which, in turn, acts to rotate shaft 26 toward the fiducial gap. On the other hand, if di-function quantizer 30 is producing a negatively valued signal $p$, indicating that the error is being reduced, then, in order to reduce the effects of overshoot, flip-flop R will proceed to produce in its output signal $r$ a di-function value of plus one-half, that is, signal $r$ contains three consecutive $+1$ values followed by a $-1$ value, each grouping of four of such values repeating serially.

On the other hand if shaft 11 rotates further than shaft 26 in the designated negative or clockwise direction, such will be indicated by a contact between brush K and segment 19, the resulting signal on brush K indicating that, as defined, a negative displacement has occurred. If, during the appearance of this negative error signal, the output signal $p$ of quantizer 30 should either be zero-valued or negatively valued, indicating no change and increase, respectively, of the negative error, then flip-flop R is triggered to produce a continuous stream of $-1$ values in its output signal $r$ such that motor 28 will be energized the maximum amount for reducing the displacement error. On the other hand, if signal $p$ is positively valued indicating that the error is being reduced and the brushes are approaching the fiducial mark, then, in order to minimize over-shoot, flip-flop R will proceed to produce in signal $r$ a di-function value of minus one-half as evidenced by recurring cycles having three consecutive $-1$ instantaneous values followed by a single $+1$ value.

Considering now in specific detail the manner of operation of the system according to Figure 1, it is desirable first to point out in detail the operation of quantizer 30 as it relates to the relative displacements between discs 13 and 24.

First of all, as will be appreciated from the quantizer description in the above referred to application for patent, quantizer 30 produces a normally zero valued di-function output signal, that is, one having alternate $+1$ and $-1$ instantaneous values, each of such values appearing during a single timing interval measured or marked by timing signal $cl$. If now, the high voltage level of battery 22 is applied sequentially by segment 15 and arms 16 to brushes B, A and C, an extra +1 instantaneous difunction value will be produced in signal $p$, that is, two consecutive +1 values. On the other hand, if the brush contact sequence B, C and A is made, then the normally zero signal $p$ value will contain an extra −1 value, that is, two consecutive −1 values. Thus, if disc 13 should make a relatively positive or counter-clockwise displacement relative to disc 24, then arms 16 will provide brush contact sequences of B, A and C with the resulting extra +1 values being produced in signal $p$. On the other hand, a relatively negative or clockwise displacement of disc 13 relative to disc 24 will produce B, C and A brush contact sequences with quantizer 30 producing extra −1 values in signal $p$. As will be noted, the clockwise and counterclockwise relative displacements of disc 13 relative to disc 24 are indicated by negatively and positively designated arrows around shaft 11.

In general, six possible combinations of signal $p$ difunction values and brush L and K contact positions are possible. These may be paired and summarized as follows:

Case I (a) If brush L is contacting segment 18 and signal $p$ contains extra +1 instantaneous values, then the positive error between discs 13 and 24 is increasing, that is, brush L is being moved in a direction away from null or fiducial gap 20.

(b) If brush K is contacting segment 20 and extra −1 values appear in signal $p$, then the negative error is increasing with brush K being moved away from gap 20.

Case II (a) If brush L is engaging segment 18 and signal $p$ is of a zero di-function value, then the displacement error between brush L and the fiducial gap is remaining constant.

(b) If brush K is contacting segment 19 and signal $p$ is of zero value, then the displacement error is remaining constant.

Case III (a) If brush L is contacting segment 18 and signal $p$ contains extra −1 values, then brush L is approaching the fiducial gap and the displacement error between the two discs is decreasing.

(b) If brush K is contacting segment 19 and signal $p$ contains extra +1 values then the error is decreasing and brush K is approaching the fiducial gap.

As stated previously, during the operating conditions defined by Cases I$a$ and II$a$, flip-flop R is triggered so that its output signal $r$ comprises a series of consecutive +1 difunction values in order that motor 28 will be driven with full power in the direction toward null. Also, during the conditions defined in I$b$ and II$b$ above, flip-flop R is triggered such that signal $r$ comprises a continual stream of −1 values in order that motor 28 will be driven with full power in its negative direction toward null.

During the operating condition defined by Case III$a$ flip-flop R is triggered such that signal $r$ has an effective difunction value of plus one-half and, in particular, contains groups of three consecutive +1 values followed by a single −1 value. Motor 28 will thus receive one-half of the power received during Cases I$b$ and II$b$ for driving disc 24 toward null. This application of half-power during intervals null is being approached is effective in minimizing overshoot, that is, disc 24 being driven such that brush L passes the fiducial gap with an ensuing brush K segment 19 contact.

In the same manner, during condition III$b$ above, flip-flop R is triggered such that signal $r$ contains a series of groups of three −1 di-function values followed by a single +1 value with the result that motor 28 receives one-half power in a direction to establish null. As above, this application of one-half power tends to minimize the possibility of overshoot characterized by brush K being driven past the fiducial gap with an ensuing brush L segment 18 contact.

Gating network 36 comprises a plurality of "and" and "or" gating circuits so connected to the $S_r$ and $Z_r$ input conductors of flip-flop R to provide the above stated triggering results with respect to signal $r$. However, as will be apparent, for gating network 36 to distinguish the intervals that signal $p$ of quantizer 30 contains extra +1 or extra −1 values, it is necessary that signal $p$ be delayed one timing interval in order that it and the delayed signal may be continuously compared for simultaneously identical values. This is possible since, as stated previously, each extra +1 value in signal $p$ is characterized by two consecutive +1 instantaneous values, while each extra −1 value in signal $p$ is characterized by two consecutive −1 instantaneous values.

This delay is provided for by applying signals $p$ and $p'$ to "and" gating circuits 34 and 35, respectively, along with timing signal $cl$ and applying the output signals of these gating circuits to the $S_q$ and $Z_q$ input conductors of flip-flop Q. As will be apparent, whenever signal $p$ is at its high voltage level, a triggering signal will be applied at the beginning of the next following timing interval to the $S_q$ input terminal with the result that signal $q$ will be correspondingly at a high voltage level. On the other hand, whenever signal $p'$ is high, then a triggering signal will be applied at the beginning of the next following interval to the $Z_q$ input conductor of flip-flop Q with the result that signal $q'$ will be at its high voltage level.

Flip-flops $C_1$ and $C_2$ are interconnected to form a two stage binary counter for counting in steps of four, the timing intervals measured or marked by signal $cl$. Thus, for example, whenever signals $c_1$ and $c_1'$ are high and low, respectively, for a given interval, at the beginning of the next following interval, owing to signal $c_1$ being applied to gating circuit 39 connected to the $Z_{c_1}$ input conductor of flip-flop $C_1$, a triggering signal will be applied to the $Z_{c_1}$ conductor to reverse the conduction state of flip-flop $C_1$ with signals $c_1$ and $c_1'$ going low and high, respectively, for the next interval. At the end of this next interval, owing to signal $c_1'$ being applied to gating circuit 38, a corresponding triggering signal will be applied to the $S_{c_1}$ input conductor of flip-flop $C_1$ with the result that its conduction state will again be reversed, signals $c_1$ and $c_1'$ returning to their high and low voltage levels, respectively.

Thus, the conduction state of flip-flop $C_1$ will be reversed at the end of each timing interval with the binary digit values represented by signal $c_1$ corresponding to the units place digit count of the timing intervals. Gating circuits 41 and 42 are connected to the $S_{c_2}$ and $Z_{c_2}$ input conductors, respectively, of flip-flop $C_2$ and deliver triggering signals thereto such that the binary values represented by the voltage levels of signal $c_2$ count, in steps of two, the digit values represented by signal $c_1$. Thus, the signal $c_2$ values represent the twos place digit of the timing interval count.

During any four consecutive timing intervals marked by signal $cl$, the signals $c_1$ and $c_2$ voltage levels will represent the four below set-forth digit value combinations:

(1) Signals $c_1$ and $c_2$ equal to 0 and 0, respectively;
(2) Signals $c_1$ and $c_2$ equal to 1 and 0, respectively;
(3) Signals $c_1$ and $c_2$ equal to 0 and 1, respectively; and
(4) Signals $c_1$ and $c_2$ equal to 1 and 1, respectively.

During the before defined operating periods that motor 28 is to receive full forward or full reverse power, as exemplified by a continuous stream of +1 or −1 values, respectively, in signal $r$, the counted intervals as represented by the $C_1$ and $C_2$ flip-flop conduction states are not utilized by gating networks 36 to control the triggering operation of flip-flop R. However, the output signals of flip-flops $C_1$ and $C_2$ are used by the network whenever the motor is to receive one-half forward or reverse energization.

In particular, whenever a half-positive power application is required, then flip-flop R is triggered to produce a +1 value in signal $r$ during the above set forth (1), (2), and (3) counted intervals. Then, during the count interval (4) above, flip-flop R is triggered to its low voltage state. Thus, motor 28 will receive for each counted group of four intervals, full forward energization during the first three intervals and then full energization in its reverse direction during the last interval. This, in turn, is equivalent to one-half maximum power application since, the reverse energy applied during the final timing interval will neutralize the application of forward energy for one of the first three timing intervals. Thus, an effective maximum application of full forward driving power is applied for two of each four timing intervals and thus is equivalent to an application of one-half full power to the motor.

In the same manner, when motor 28 is to receive one-half reverse energization, then, during each of the (1), (2), and (3) intervals, flip-flop R is triggered to produce $-1$ values in signal $r$ while, during the remaining (4) interval, flip-flop R is triggered to produce an $r=+1$. This, in turn, is equivalent to an application of one-half of the maximum power to motor 28 in its reverse direction, since the final interval of forward energy application counteracts one of the first three intervals during which full reverse energy is applied to the motor. Thus, full reverse energy is applied to the motor effectively during only two of each timing interval group and accordingly represents an application of one-half maximum energy to the motor in its reverse direction.

Referring now to Figure 2, there is illustrated in block schematic form the combination of "and" and "or" gating circuits comprising gating network 36 of Figure 1. As before stated, gating network 36 receives as input signals, the $k$, $l$, $p$, $p'$, $q$, $q'$, $c_1$, $c_1'$, $c_2$, $c_2'$, and $cl$ signals and, in turn, produces output signals which are applied to the $S_r$ and $Z_r$ input conductors of flip-flop R. In particular, the Boolean equation corresponding to the gating circuitry connected to the $S_r$ input conductor may be written as:

$$S_r = [(p+q+c_1'+c_2').l+p.q.c_1.c_2.k].cl \quad (1)$$

In the same manner, the equation defining the gating circuitry connected to the $Z_r$ input conductor of flip-flop R may be expressed by:

$$Z_r = [(p'+q'+c_1'+c_2').k+p'.q'.c_1.c_2.l].cl \quad (2)$$

Equations 1 and 2 above may be derived quite readily by forming a so-called truth table, as known in Boolean algebra, in which is set forth as logical statements or propositions the desired values of signal $r$ for the various combinations of input signal values, as before defined. Then, from the table, Boolean equations may be written which, in turn, represent the operations therein stated and, the equations thus written may be simplified and reduced by the use of logical tautologies to the simplified equations herein set forth above. As recognized by those skilled in the art, other equations corresponding to Equations 1 and 2 above may be derived from them quite simply by manipulations performed thereon in accordance with these tautologies and Boolean algebra rules, each of the equations thus derived corresponding to gating circuitry capable of performing the identical functions as specifically set forth in Figure 2.

The manner of mechanizing these equations, that is converting them into corresponding combinations of "and" and "or" gating circuitry is set forth in detail in the above referred to application for patent. It will be appreciated functionwise, that, considering Equation 1 for example, a signal will be applied to the $S_r$ terminal whenever, considering the first product term, signal $p$ or $q$ or $c_1'$ or $c_2'$ is at its high voltage level simultaneously with signals $l$ and $cl$. Also, considering the other product term in Equation 1, a signal will be applied to the $S_r$ conductor whenever signals $p$, $q$, $c_1$, $c_2$, $k$ and $cl$ are simultaneously at their high voltage level. In the same manner, considering Equation 2, a triggering signal will be applied to the $Z_r$ input conductor whenever, considering the first product term, signals $p'$ or $q'$ or $c_1'$ or $c_2'$ is high simultaneously with $k$, $c_2''$, $l$ and $cl$. Considering the second term, a triggering signal will be produced whenever signals $p'$, $q'$, $c_1$, $c_2$, $l$ and $cl$ are all simultaneously high.

Referring now to Figure 3, there is illustrated motor control circuit 44 in conjunction with a detail schematic representation of motor 28. In particular, signal $r$ is applied to the input terminal of a direct current amplifier 46, the output terminal of which is coupled to one end of an armature winding 52 included within motor 28. Signal $r'$ is applied to the input terminal of another direct current amplifier 48, similar to amplifier 46, the output terminal thereof being connected to one end of another armature winding 54 included within motor 28. The other ends of windings 52 and 54 are each connected to ground.

In operation, the input conductor of each amplifier is internally biased so that when its respective input signal is at its low level, no output potential is generated with the result that no current flow is produced through its associated armature winding. On the other hand, when its input signal is high, then an output potential is produced of such magnitude as to produce rated current flow through its related winding.

Windings 52 and 54 are so positioned relative to armature 50 that current flow from amplifier 46 to ground through winding 52 produces a clockwise or positively designated rotation of the armature. On the other hand, when current flows from amplifier 48 through winding 54 to ground, then armature 50 is rotated in its counterclockwise or negatively designated direction.

It is thus seen that when signals $r$ and $r'$ are high and low, respectively, a current flow will be produced only through armature winding 52 and armature 50 rotated in its positive direction. On the other hand, when signals $r$ and $r'$ are low and high, respectively, then the resulting current flow is through winding 54 and a negative direction of rotation of armature 50 effected. As will be observed, since signals $r$ and $r'$ are complementary, armature 50 will always receive full energization in either its positive or negative direction at all times.

In the event input shaft 11 should lead or lag by substantially 180° the driven or output shaft 26, brushes L and K will fall within overriding gap 21 and hence neither will have applied thereto the potential of battery 22. Upon more or less relative displacement then, one of the brushes will produce error information with the servo system continuing its set forth operation. If gap 21 were not provided, then both brushes would apply output signals to network 36 and, as as may be seen from Equations 1 and 2, triggering signals would be simultaneously supplied to both the $S_r$ and $Z_r$ conductors of flip-flop R with a resulting undefined and ambiguous operation thereof.

As will be appreciated by those skilled in the art, other types of motor control circuits, similar to circuit 44, may be utilized for accomplishing the herein set forth operation. Thus, relay circuits may be employed for introducing power into the windings, assuming the frequency of signal $cl$ is sufficiently low in comparison to their response time.

As will also be apparent to those skilled in the art, certain parameter relationships should be maintained between the inertia of armature 50 and shaft 26 and the frequency of signal $cl$. It is preferable to have the relationships such that a zero valued di-function will effect no general overall shaft displacement. On the other hand, the inertia of the armature must not be so great that a half maximum power applied thereto would be incapable of changing or producing a change of the shaft displacement.

I claim:

1. A di-function servo system for controlling the energization of a motor whereby the shaft of the motor rotates in accordance with the rotation of a freely rotatable shaft, said system comprising: means for electrically sensing the direction of relative displacement between the shaft of the motor and the freely rotatable shaft; means for producing a di-function signal whose value indicates whether said relative displacement is increasing, decreasing, or remaining constant; and means responsive to the value of said di-function signal and the direction of said relative displacement as sensed by the first named-means for controlling the application of energy to the motor to reduce said relative displacement.

2. In combination: first and second shafts; a motor responsive to first and second input signals for driving said second shaft in first and second directions, respectively; di-function quantizer means responsive to first and second directions of relative movement between said first and second shafts for producing a positively and negatively valued output di-function signal, respectively; and means responsive to the positively and negatively valued output di-function signals from the quantizing means for applying a preponderance of second or first input signals, respectively, to said motor whereby said motor is energized to maintain the angular displacement of said second shaft substantially equal to the angular displacement of said first shaft.

3. A motor control system for use with a freely rotatable shaft and a second shaft driven by a motor, said motor being responsive to first and second potential levels of an applied signal for rotating in first and second directions, respectively, said first and second shafts being normally displaced in a null position relative to each other, said motor control system comprising: selectively actuable means for producing an output signal having either a first or second potential level; means responsive to a displacement of said second shaft in said second direction away from the null position for actuating said actuable means into producing a series of said first potential levels in said output signal; and means responsive to a displacement of said second shaft in said first direction away from the null position for actuating said actuable means into producing a series of said second potential levels in said output signal; and means for applying said output signals to the motor.

4. A servo system for use with a member freely movable in first and second directions, said system comprising: a driven member corresponding to the movable member; means mechanically coupled to said driven member and responsive to forward and reverse energizations for driving said driven member in the first and second directions, respectively, corresponding to the first and second directions of movement of said movable member; means for producing either a first or second signal when said driven member is displaced in said first and second directions, respectively, relative to the movable member; means for producing a di-function signal of positive and negative values when the movement of the driven member relative to the freely movable member is increasing in said first and second directions, respectively; means responsive to the simultaneous appearance of said first signal and a positive value in said di-function signal for applying full reverse energization to the first-named means; means responsive to the simultaneous appearance of said first signal and a negative value in said di-function signal for applying one-half full reverse energization to said first-named means; means responsive to the simultaneous appearance of said second signal and a negative value in said di-function signal for applying full forward energization to said first-named means; and means responsive to the simultaneous appearance of said second signal and a positive value in said di-function signal for applying one-half full forward energization to said first-named means.

5. A servo system for use with a freely rotatable shaft, said system comprising: an output shaft aligned with the freely rotatable shaft; error sensing means producing first and second error signals when said output shaft and the freely rotatable shaft are misaligned in positive and negative directions, respectively; driving means coupled to said output shaft, said driving means being responsive to first and second input signals for driving said output shaft so as to decrease said positive and negative misalignments, respectively; quantizing means for producing positively and negatively valued di-function output signals when the misalignment between the freely rotatable and said output shaft is increasing in the positive and negative directions, respectively; first means responsive to the simultaneous appearance of said first error signal and said positively valued di-function output signal for applying a series of first signals to said driving means; second means responsive to the simultaneous appearance of said first error signal and said negatively valued di-function output signal for applying a series of alternate first and second signals to said driving means, each of said first signals appearing for a longer time than each of said second signals; third means responsive to the simultaneous appearance of said second error signal and said negatively valued di-function output signal for applying a series of second signals to said driving means; and fourth means responsive to the simultaneous appearance of said second error signal and said positively valued di-function output signal for applying alternate first and second signals to said driving means, each of said second signals appearing for a longer time than each of said first signals.

6. A di-function non-linear servo system comprising: a command shaft; a driven shaft, said command and driven shaft being in a null position at a predetermined angular displacement relative to each other; means for producing first and second error signals corresponding to first and second relative displacement directions, respectively, between said shafts away from said null position; means for producing a first di-function signal having positive and negative values when the relative displacement is changing in said first and second directions, respectively, and a zero value when the relative displacement is not changing; motor means coupled to said driven shaft and responsive to positive and negative valued di-function input signals for rotating said driven shaft toward null during said first and second relative displacements, respectively; means for producing a second di-function signal, said second di-function signal having a full positive di-function value during the simultaneous appearance of said first error signal and a zero or positive value in said first di-function signal, a one-half positive di-function value during the simultaneous appearance of said first error signal and a negative value in said first di-function signal, a full negative di-function value during the simultaneous appearance of said second error signal and a zero or negative value in said first di-function signal or a one-half negative di-function value during the simultaneous appearance of said second error signal and a positive value in said first di-function signal; and means for applying said second di-function signal to said motor means.

7. A device for providing movement to a first movable member such that it follows the movement of a second member freely movable in two directions, said device comprising: means for producing a first signal indicating the direction of displacement between the first and second movable members; means for producing a di-function signal whose value indicates the direction of relative movement between the first and second movable members; and means simultaneously responsive to said first signal for moving said first member toward said second member and to the value of said di-function signal for determining the power applied for such movement.

8. A device for maintaining a predetermined relative null position between first and second movable members, each of said members being movable in two directions, said device comprising: first means for producing a first signal indicating the direction of relative displacement of said members from said relative null position; second means for producing a di-function signal whose value indicates the direction of the rate of change of said relative displacement; and third means, responsive to said first signal and said di-function signal, for moving one of said members in a direction to reduce said relative displacement and return said members to said relative null position.

9. A device for maintaining a predetermined relative null position between first and second movable members, each of said members being movable in two directions, said device comprising: first means for producing a first signal indicating the direction of relative displacement of said members from said relative null position; second means for producing a first di-function signal whose value indicates the direction of the rate of change of said relative displacement; and third means for combining said first signal and said first di-function signal to produce a second di-function signal whose value is a function of said relative displacement and said rate of change of said relative displacement; and fourth means, responsive to said second di-function signal, for moving one of said members in a direction to reduce said relative displacement and return said members to said relative null position.

10. A device for maintaining a predetermined relative null position between first and second movable members, each of said members being movable in two directions, said device comprising: first means for producing a first signal indicating the direction of relative displacement of said members from said relative null position; second means for producing a first di-function signal whose value indicates the direction of the rate of change of said relative displacement; and third means for combining said first signal and said first di-function signal to produce a second di-function signal having a preponderance of first and second levels when said relative displacement is in first and second directions, respectively; and fourth means, responsive to said second di-function signal, for moving said members relative to each other in accordance with the levels of said second di-function signal.

11. The device defined in claim 10, wherein said fourth means includes means for controlling the preponderance of said levels in said second di-function signal in accordance with the value of said first di-function signal.

12. A device for maintaining a predetermined relative null position between first and second movable members, each of said members being movable in two directions, said device comprising: first means for producing a first signal indicating the direction of relative displacement of said members from said relative null position; second means for producing a first di-function signal train whose value indicates the rate of change of said relative displacement; third means, responsive to said first signal and said first di-function signal train, for producing a second di-function signal train having a preponderance of first-valued and second-valued signals when said relative displacement is in first and second directions, respectively, the preponderance of signals in said second di-function signal train being in accordance with the value of said first di-function signal train; and fourth means, responsive to said second di-function signal train, for moving said members relative to each other in accordance with the values of the signals of said second di-function signal train.

References Cited in the file of this patent

UNITED STATES PATENTS

| | | |
|---|---|---|
| 2,445,289 | Cherry | July 13, 1948 |
| 2,506,798 | Lilja | May 9, 1950 |
| 2,537,427 | Seid et al. | Jan. 9, 1951 |
| 2,630,481 | Johnson | Mar. 3, 1953 |
| 2,630,552 | Johnson | Mar. 3, 1953 |
| 2,631,239 | Lower | Mar. 10, 1953 |
| 2,643,355 | Hallman, Jr. | June 23, 1953 |